United States Patent

[11] 3,621,258

| [72] | Inventors | David R. Dreitzler |
| | | Huntsville; |
| | | Lawrence B. Thorn, Madison; Roy E. Yell, Huntsville, all of Ala. |
| [21] | Appl. No. | 20,762 |
| [22] | Filed | Mar. 18, 1970 |
| [45] | Patented | Nov. 16, 1971 |
| [73] | Assignee | The United States of America as represented by the Secretary of the Army |

[54] PELTIER-CONTROLLED BOLOMETER TEMPERATURE REFERENCE TECHNIQUE
2 Claims, 1 Drawing Fig.

| [52] | U.S. Cl. | 250/83.3 H, 73/355 R |
| [51] | Int. Cl. | G01j 1/16 |
| [50] | Field of Search | 73/355 R, 355 EM; 250/83.3 H |

[56] References Cited
UNITED STATES PATENTS

| 3,225,201 | 12/1965 | Cook | 250/83.3 H |
| 3,387,134 | 6/1968 | Treharne | 73/355 R X |
| 3,309,881 | 3/1967 | Beerman | 73/355 R X |
| 3,103,587 | 9/1963 | Ure et al. | 73/355 R X |
| 3,435,223 | 3/1969 | Haner et al. | 250/83.3 H |

Primary Examiner—Louis R. Prince
Assistant Examiner—Frederick Shoon
Attorneys—Harry M. Saragovitz, Edward J. Kelly, Herbert Berl and Aubrey J. Dunn ABSTRACT: Means for stabilizing the thermal operating point of a thermistor bolometer, wherein the detector block on which the thermistors are mounted is maintained at a predetermined temperature. The compensating thermistor mounted on the detector block is connected in a Wheatstone Bridge configuration to thereby cause a signal to be generated which causes Peltier heating or cooling of the block as the situation requires.

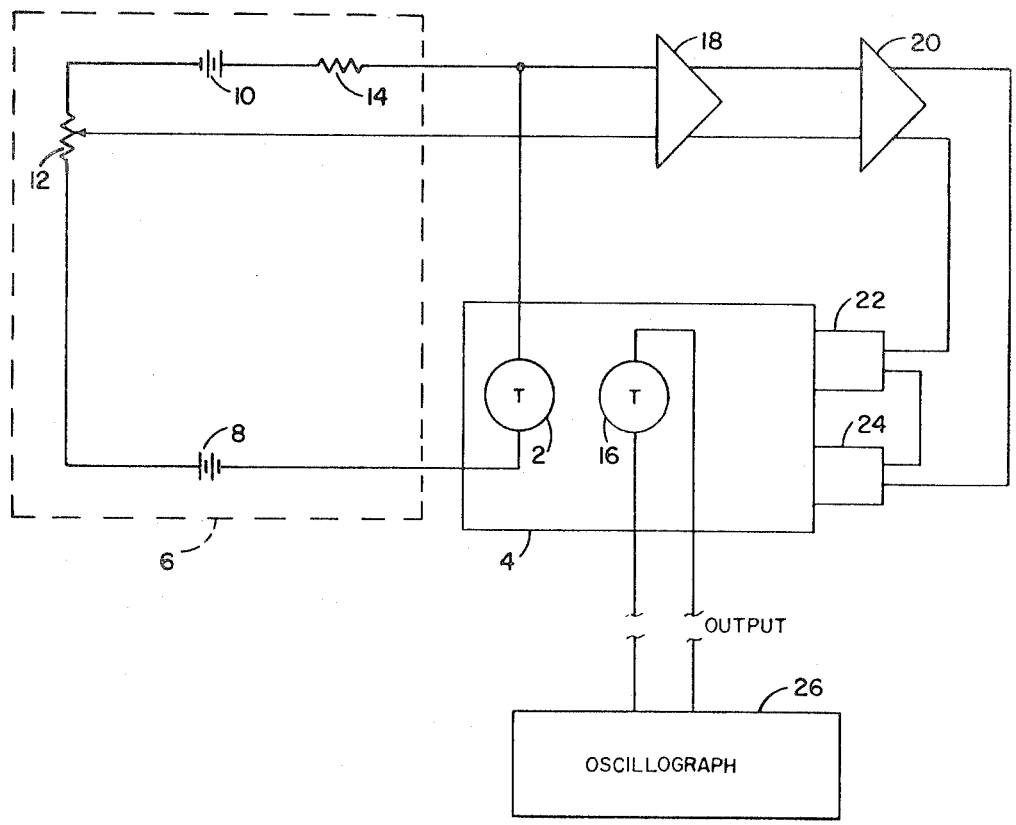
David R. Dreitzler
Lawrence B. Thorn
Roy E. Yell,
INVENTORS.

3,621,258

PELTIER-CONTROLLED BOLOMETER TEMPERATURE REFERENCE TECHNIQUE

BACKGROUND OF THE INVENTION

Bolometers are available which have temperature compensation or reference techniques. One involves carefully matching the electrical and thermal characteristics of the thermistor flakes. One flake, the active thermistor, is exposed to the infrared radiation of interest. The other flake, the compensating thermistor, is optically shielded from the radiation being investigated. This method reduces output voltage drift due to ambient temperature variations near the designed operating point of the thermistor in question. Large temperature excursions can cause the operating point to shift out of the linear range of the thermistors, thereby resulting in an offset in voltage and loss of sensitivity because the bias conditions are other than optimum.

Accordingly, it is an object of this invention to provide a device which automatically stabilizes the electrical and thermal operating point of the thermistors.

SUMMARY OF THE INVENTION

The present invention provides a means for stabilizing the thermal operating point of a thermistor bolometer. The detector block on which the thermistors are mounted is maintained at a predetermined temperature. The compensating thermistor mounted on the detector block is connected in a Wheatstone Bridge configuration to thereby cause a signal to be generated which causes Peltier cooling or heating of the block as the situation requires.

DESCRIPTION OF THE PREFERRED EMBODIMENT

Referring to the single FIG. drawing, thermistor 2 and 16 are placed in intimate thermal contact with bolometer detector mounting block 4. The resistance of thermistor 16, the active thermistor, may be monitored on an oscillograph 26 or other similar devices. Thermistor 2 is electrically connected to thermistor bias circuits 6, a modified Wheatstone Bridge configuration consisting of 2 similar dry cell batteries 8 and 10, balancing resistor 12, and an inactive bridge arm 14. The temperature of thermistor 2 determined the output from the modified Wheatstone Bridge. The bridge output is fed to preamplifier 18 which has an adjustable voltage gain. Preamplifier 18 drives power amplifier 20, causing sufficient current to flow in thermoelectric devices 22 and 24 to cause Peltier cooling or heating as the situation requires. Thermoelectric devices 22 and 24 close the control loop through detector mounting block 4 and thermistor 2. The overall result of this action is that the temperature of the detector block is maintained at a constant value.

In operation, the value of resistor 12 is adjusted to cause the feedback desired to maintain the temperature of detector mounting block 4 at a predetermined value. The operation of this device is based on the principles of close-loop control, i.e., the input is amplified to produce an output which is made to cause the input to return to its original condition. The input signal is provided by thermistor detector 2, the resistance of which decreases as the temperature of the bolometer mounting block tends to increase due to the ambient temperature increase. This resistance change is converted to a voltage change by the thermistor bias circuit or Wheatstone Bridge. The voltage change is amplified in both voltage and current and is applied to thermoelectric cooling devices 22 and 24. The power applied to the cooling devices causes heat to be removed from the bolometer mounting block, lowering its temperature. The thermistor temperature is lowered, causing its resistance to return to its original value. In a similar manner the block would be heated if the ambient temperature decreases since all elements are bidirectional.

This technique can be utilized to stabilize the operating point of any device whose characteristics are thermally sensitive. It has the advantage of being capable of supplying or removing heat from the device being stabilized as required by environmental variations.

We claim:

1. A bolometer having Peltier-controlled temperature reference means, said bolometer comprising a first and second thermistor mounted on a detector block, said first thermistor being the compensating thermistor and said second thermistor being the active thermistor; said temperature reference means comprising a heating and cooling means connected for heating and cooling said detector block; means responsive to said first thermistor for causing said heating and cooling means to heat or cool said block according to the temperature sensed by said first thermistor; said means responsive to said first thermistor comprising a first and second battery; a potentiometer having a first and second terminal and a terminal connected to a sliding contact; a resistor; a preamplifier; and a power amplifier; said first terminal of said potentiometer being connected to a first side of said first battery; said second terminal of said potentiometer being connected to a second side of said second battery; said resistor being connected between the first side of said second battery and a first input terminal of said preamplifier, said first input terminal of said preamplifier being connected to the second side of said first thermistor; said sliding contact being connected to a second input of said preamplifier; said first battery having a second side connected to a first side of said first thermistor; said preamplifier having its output connected to the input of said power amplifier; and said power amplifier having its output connected to said heating and cooling means.

2. The invention as set forth in claim 1 wherein said heating and cooling means comprises thermoelectric devices connected across said output of said power amplifier; and further comprising an oscillograph connected across said second or active thermistor for recording the output thereof.

* * * * *